E. M. PRESTON & A. E. KENNARD.
APPARATUS FOR THE ELECTRIC LIGHTING OF RAILWAY CARRIAGES.
APPLICATION FILED SEPT. 29, 1908.
921,454.
Patented May 11, 1909.
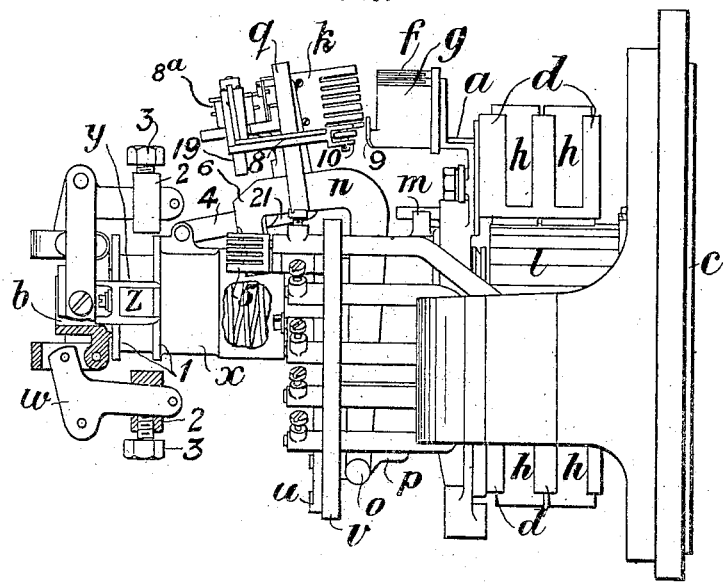
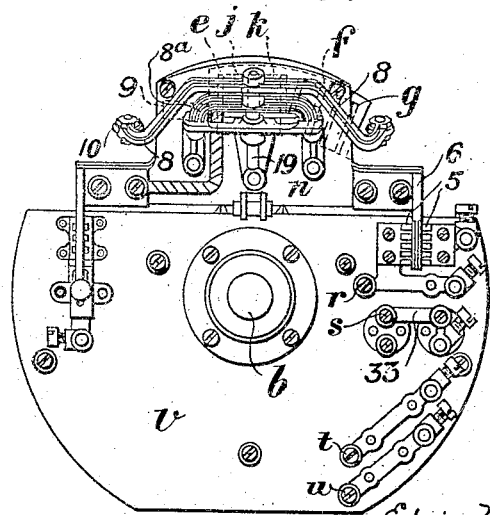
Witnesses.
Inventors.

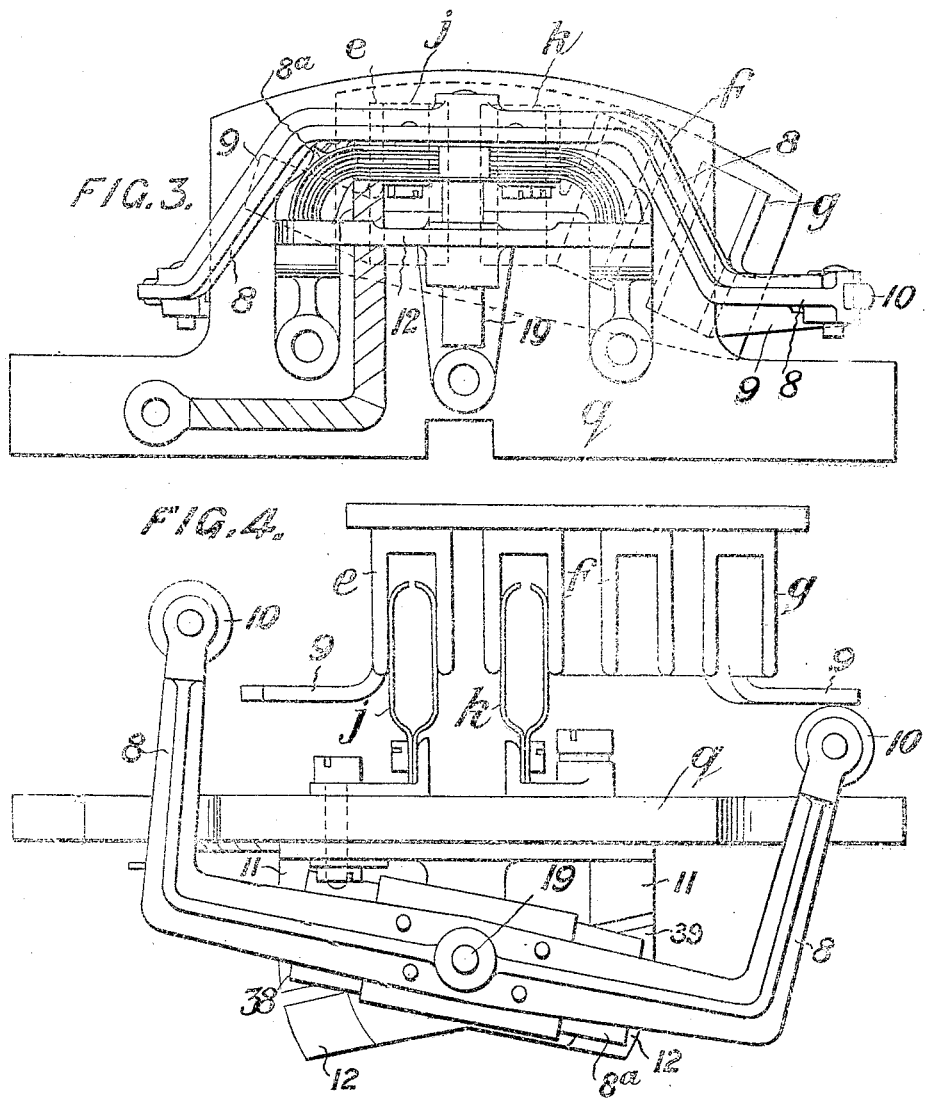

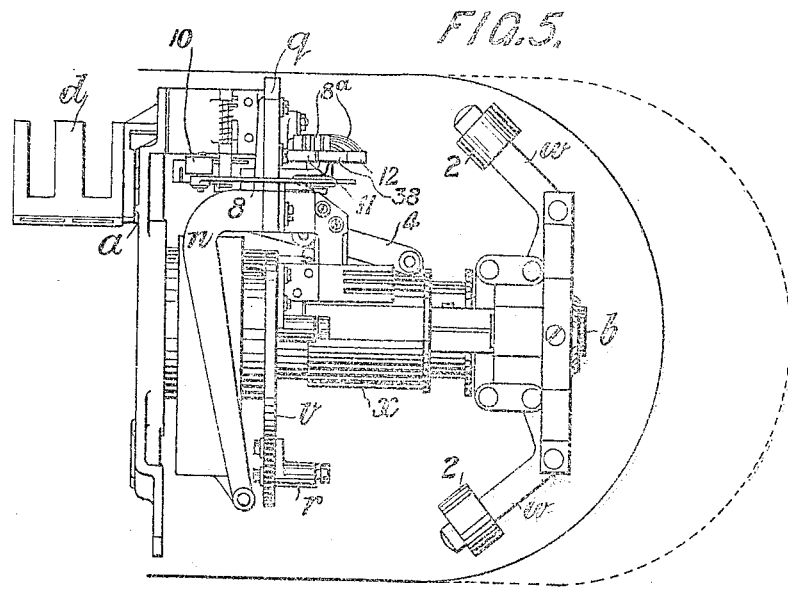
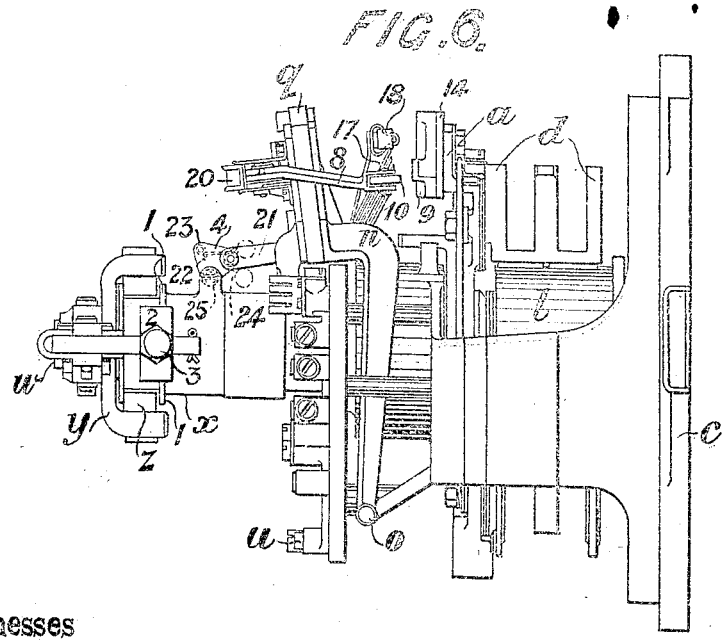

E. M. PRESTON & A. E. KENNARD.
APPARATUS FOR THE ELECTRIC LIGHTING OF RAILWAY CARRIAGES.
APPLICATION FILED SEPT. 29, 1908.
921,454.
Patented May 11, 1909.
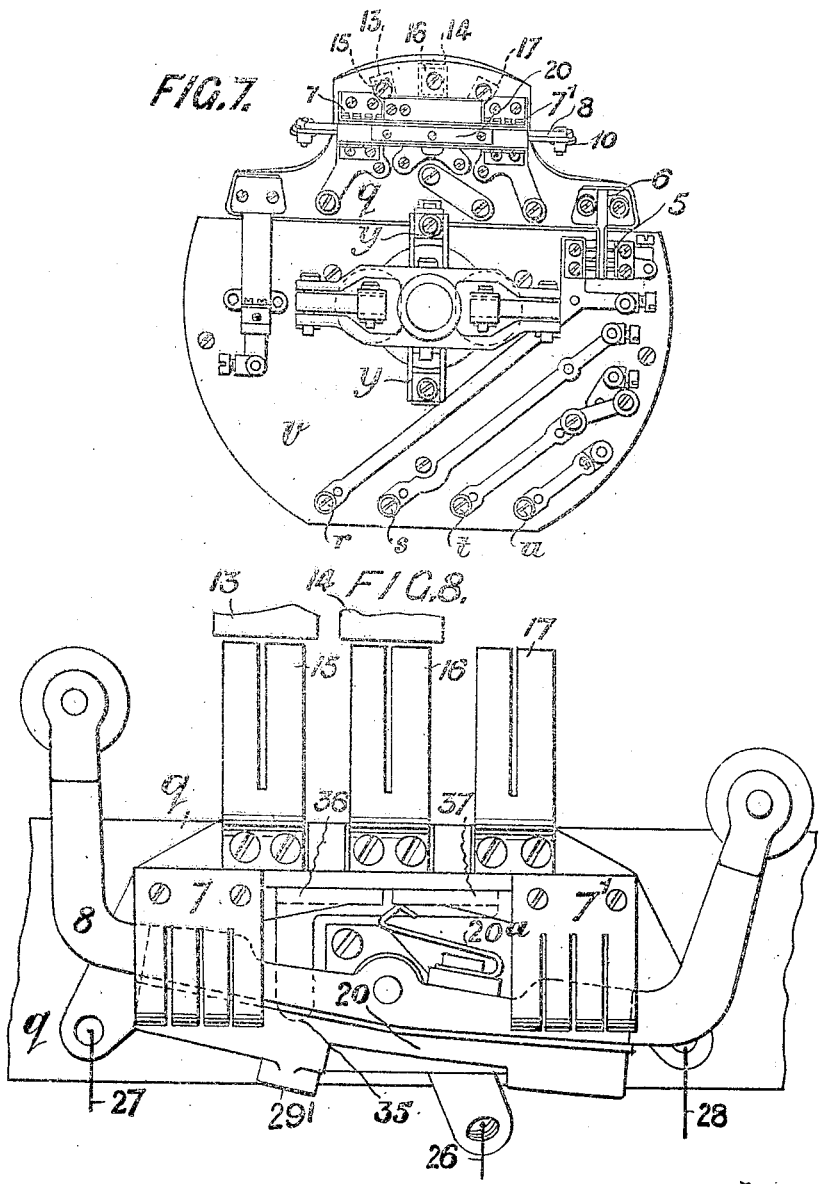
Witnesses.
Jesse N. Sutton
R. N. Dommers
Inventors.
Edwin Mumford Preston
Alfred Ernest Kennard
by Henry Orth
Atty E. M. PRESTON & A. E. KENNARD.
APPARATUS FOR THE ELECTRIC LIGHTING OF RAILWAY CARRIAGES.
APPLICATION FILED SEPT. 29, 1908.
921,454.
Patented May 11, 1909.
6 SHEETS—SHEET 5.
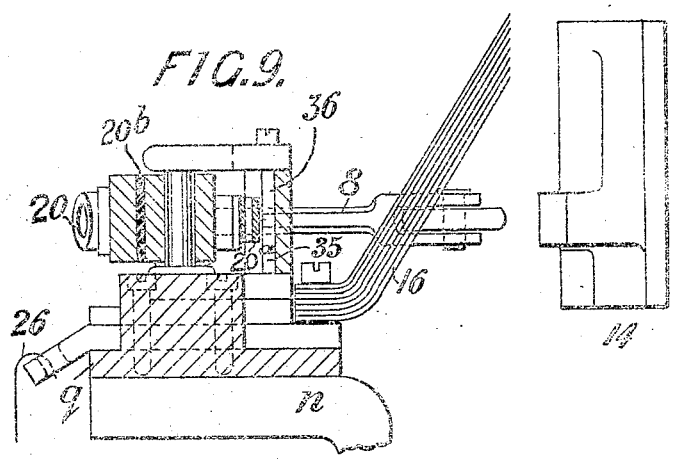
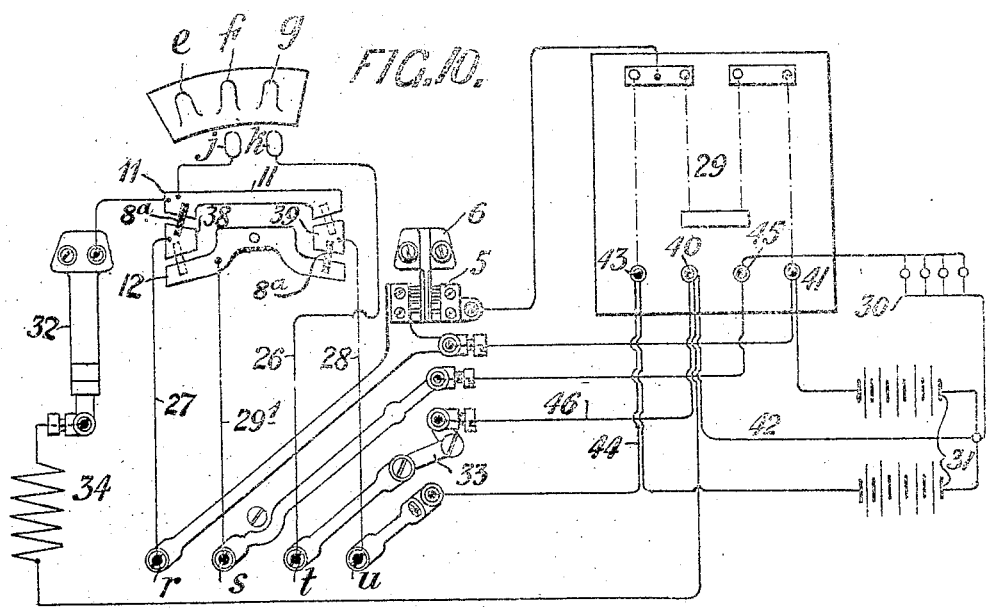
Witnesses.
Inventors.
Edwin Mumford Preston
Alfred Ernest Kennard
by

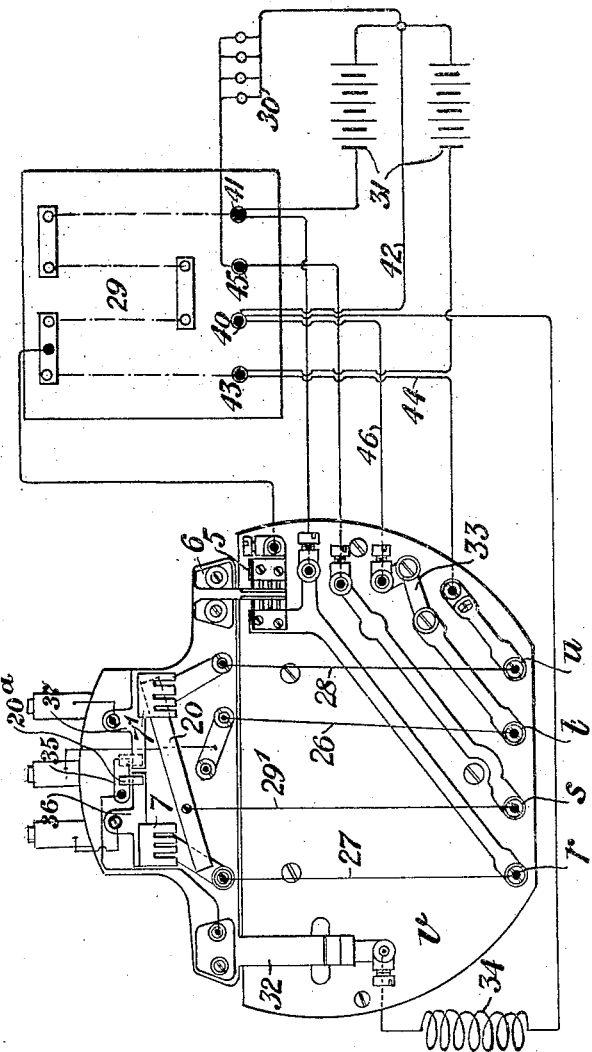

UNITED STATES PATENT OFFICE.

EDWIN MUMFORD PRESTON, OF DEPTFORD, AND ALFRED ERNEST KENNARD, OF ANERLEY, ENGLAND.

APPARATUS FOR THE ELECTRIC LIGHTING OF RAILWAY-CARRIAGES.

No. 921,454.

Specification of Letters Patent.

Patented May 11, 1909.

Application filed September 29, 1908. Serial No. 455,380.

*To all whom it may concern:*

Be it known that we, EDWIN MUMFORD PRESTON and ALFRED ERNEST KENNARD, both subjects of the King of Great Britain, residing, respectively, at Deptford, in the county of Kent, England, and 23 Wheathill road, Anerley, in the county of Surrey, England, have invented new and useful Improvements in Apparatus for the Electric Lighting of Railway-Carriages, of which the following is a specification.

This invention relates to improvements in apparatus for the electric lighting of railway carriages of the type in which a dynamo on each carriage, or on some of the carriages, of a train is driven from one of the wheel axles of such carriage or carriages to supply current to the lamps when the train is traveling above a certain speed and to charge a battery or batteries and in which the said lamps are supplied with current from such battery or batteries when the speed of the train decreases to a certain extent or when the train is stationary, the switch for disconnecting the batteries and lamps from the dynamo and on the contrary for connecting the batteries and lamps to the dynamo being operated automatically by a governor operating a pivoted lever and the proper connections being made for the dynamo battery and lamps, irrespective of the direction of rotation of the dynamo by means of a rocking switch turned in one direction or the other by the dynamo itself.

The present invention is distinguished by a pivotal or sliding support or framework carrying the various contact plugs, which support or framework is operated by a governor to insert its plug into the proper contacts which have already been brought by their rocking support into a position opposite the plugs. The rocking support is preferably connected to the brush holders the friction of the brushes with the commutator bringing about the rocking movement. The support further carries an oscillatory switch device which is operated by suitable projections on the rocking support for the purpose of changing over the connections between the dynamo and batteries as desired.

In order to enable this invention to be readily understood reference is made to the accompanying drawings in which:—

Figure 1 is a side elevation of an improved rocking switch device constructed according to this invention. Fig. 2 is an end view of the same with parts removed. Fig. 3 is an enlarged view of a portion of Fig. 2. Fig. 4 a plan of Fig. 3. Fig. 5 is a side elevation of a modification. Fig. 6 is a side elevation of another modification of which Fig. 7 is an end view. Fig. 8 is a plan view of a modified arrangement of switch. Fig. 9 is a sectional elevation of Fig. 8. Fig. 10 is a diagrammatic view of those arrangements or constructions in which three contacts are carried upon the rocking frame, and Fig. 11 is a diagrammatic view of those arrangements in which only two contacts are carried upon the rocking frame.

According to the construction to be first described, a bracket or rocker $a$ (see Fig. 1) suitably mounted on a journal concentric with the shaft $b$ of the dynamo $c$, is adapted to carry the brushholders $d$ $d$, and on the said bracket $a$ are mounted suitable contact pieces $e f g$. The contacts $e g$ are in connection with one brush $h h$ and the contact $f$ in connection with the other brush $h h$ and the contacts are so arranged that upon the turning of the bracket or rocker $a$ through a limited arc in one direction or the other about its center, appropriate contacts $e f$ or $f g$ are brought into position for switch plugs or blades $j k$, as below described, to enter them. The friction of the brushes $h$ on the commutator $l$ is utilized to propel the rocker $a$ through the desired arc in one direction or the other according to the direction of rotation of the dynamo, and the said rocker is prevented from turning farther than is necessary by suitable stops $m$. In conjunction with this bracket or rocker $a$ a frame or support $n$ is hinged at $o$ to a fixed bracket $p$ and on the frame $n$ at the top are mounted the plugs or connecting pieces $j k$ before referred to, which pieces are so placed as to electrically connect with the appropriate contact pieces $e f$ or $f g$ on the rocker $a$ when the frame $n$ is actuated by suitable mechanism. The various blades or plugs and connections are carried conveniently on an insulating plate $q$ on the frame $n$ and flexible connecting cables (not shown) are provided to carry the current from the contact plugs $j k$ on the plate $q$ to the terminals $r s t u$, Fig. 11, on the switch board. To actuate the hinged frame $n$ a centrifugal governor $w$ is used in conjunction with a sleeve $x$ sliding on the shaft, the governor having arms $y y$ provided with projections z z which engage with a projecting flange or flanges 1 on the said sleeve x, to transmit the required movement from the governor w to the frame n. The centrifugal force of the governor w acts against a spring in the ordinary way, the weight of the governor balls or bobs 2 (which bobs may be adjustable by the set screws 3 along their arms as shown) and the strength of the spring being suitably proportioned to permit of the governor w actuating the frame n and making electrical connection when the speed of the dynamo is high enough, and the spring serves to withdraw the frame as the dynamo speed falls below a certain point.

The mechanism generally described above serves to connect the dynamo to the outside circuits to enable it to supply current in the right direction as soon as it is revolving fast enough to produce the necessary electrical energy, for as soon as the dynamo revolves in one direction the proper contacts e f or f g will be brought opposite to the plugs j and k and thereafter as soon as the speed is high enough, the governor arms will move sufficiently to cause the sleeve x by means of the link connection 4 to move the frame n so as to insert the said plugs j k in the opposed contacts. The link 4 is pivotally connected to the sleeve at one end and to a lug 21 on the frame n at the other. When the dynamo c is arranged to supply current to accumulators and lamps connected thereto, and it is desired to insert a resistance automatically in the lamp circuit, contact pieces 5, 5, are provided suitably fixed on the switch board n, and a plug or connecting piece 6 on the pivoted frame n, which serves to short-circuit or reduce the amount of the resistance in circuit when the dynamo is stopped, and insert the resistance again when the dynamo is working, all as will be hereinafter described with reference to a diagram.

Where the above type of switch is used with a "double battery" system, a change-over switch 8 8ᵃ is provided the double arm lever 8 of which may conveniently be pivoted at 19 on the hinged frame n and have its arms 8 arranged to be actuated by abutments 9 on the rocker or bracket carrying the contacts above described in order to oscillate the switch 8 8ᵃ. Antifriction rollers 10 are conveniently mounted in the ends of the arms 8. The partial revolution of the rocker is arranged to bring an abutment 9 opposite one arm 8 of the switch in one direction of rotation as seen clearly in Fig. 4 and the same or another abutment opposite the other arm of the switch in the other direction of rotation. In Fig. 4, it is seen that when one abutment 9 and arm 8 are in engagement the opposite arm 8 clears its abutment. As the frame n is moved toward the rocker a the abutment 9 is engaged by one end of one of the arms 8 and causes the switch to turn.

This serves the purpose of changing over the connections of the batteries at each reversal of direction of the dynamo. So-called "carbon breaks" as is well known may be suitably employed to make contact before and break contact after the knives of the switches make and break contact, to prevent the spark, which occurs on breaking circuit, from burning the metal contact pieces.

As seen best in Fig. 3 the contacts e and g are arranged so that when in the engaging position they are vertical whereas the contact f may be V shaped, being composed of two parts each of which when in engaging position is vertical and parallel with its corresponding member e or g. Supposing the blades or plugs j k to be lying between e and the left hand branch of the contact f as seen in Fig. 4: when the dynamo decreases its speed sufficiently the blades j k are withdrawn and upon reversal of rotation, the right hand branch of the contact f will be brought opposite j and the contact g opposite k, so that it can be arranged for k, for instance, to always be negative.

Fig. 5 shows a slightly different construction with the parts in the position which they occupy when the requisite speed has been attained. In this construction the arms 8 are fixed to the pivot of the switch beneath the latter. In this position it will be seen that the switch brushes or blades 8ᵃ, on the side from which the parts are viewed have been moved to make contact with the contact plates 11 and 38, while those on the other side have been moved outward over the plates 39 and 12 all as will be more clearly understood after the description given below of the corresponding parts seen in Fig. 10.

According to the modification shown in Figs. 6 and 7, the bracket a carries only two contacts 13 and 14 in place of the three e f g Fig. 1, and three brush contacts 15, 16, 17 are carried by the hinged frame n in place of the two plug contacts j k Fig. 1; the brushes 15, 16, 17 are each provided with a carbon break 18. Thus the two contacts 13 and 14 upon the rocking of the part a will be brought opposite the appropriate brushes 15, 16 or 16, 17 as the case may be preparatory to the circuits being closed by the governor upon the attainment of a sufficient speed. The change-over switch marked 8 8ᵃ in Fig. 1, also is modified and is now of the plug type as shown, the plugs being carried one at each end of the oscillatory bar 20. The lug 21 on the frame n projects farther toward the governor in this construction and the link 4 is say of triangular form having a spring 22 around a pin 23 and one end of the spring extended and taking over the pivot pin 24 of the link 4; or the ends of the spring may take over both the pin 24 and the pin 25. The pin 24 is formed with a notch into which the spring end takes thereby holding the pin in place without the aid of a linch pin or lock nut. The end of the pin is suitably rounded or beveled so as to lift the spring end when the pin is pushed in. The relative positions of the pins 24 and 25 and the length of the link 4 have been so calculated in this modification that when the brushes have been moved on to their contacts 13, 14 the brushes 15, 16 and 17 shall not be unduly flexed and thus set up considerable friction between the flange 1 and the projections z z (which latter are preferably of wood), for it will be seen that as the sleeve x is moved toward the right hand in Fig. 6, the pin 25 comes under the pin 24 as indicated by the dotted circles so that at about this point the greater part of the pressure transmitted by the link 4 will be radially and not axially of the shaft.

Instead of the plate q being approximately vertical, as in the preceding constructions, the same may be arranged horizontally on the pivotal framing n, as seen in Figs. 8 and 9; these figures show on the base plate q an arrangement of three brushes 15, 16, 17 as in Figs. 6 and 7, and these brushes may if desired have a carbon break as in the earlier figures. All the parts are in this construction carried upon the upper face of the plate q including the oscillatory bar 20 and the switch parts 7, 7'. If desired the arms 8 might be made in one with the bar 20 or as shown the two parts may be connected with insulation 20$^b$ between but of course the arrangement of switch contacts 7 7', bar 20 and arms 8 can be the same as in Figs. 6 and 7. It is necessary when the three contacts 15, 16 and 17 are employed on the frame n to always cause the field magnet winding 34 to be connected in a particular manner hereinafter indicated; therefore the bar 20 is furnished with a rubbing spring contact 20$^a$ which connects across from the plate 35, (which plate 35 is connected with the field winding 34 through the switch 32 see for instance the diagram Fig. 11) to the plate 37 in connection with the brush 17 as shown when the switch 8 is connecting with the contact 7 belonging to the brush 15 and from the plate 35 to the plate 36 in connection with the brush 15 when connection is made between the arm 8 and contact 7' belonging to the brush 17 thus the winding 34 is always in parallel with the battery being charged, as well as with the lamps and their resistance as will hereinafter appear.

The action of those constructions embodying three contacts on the rocker will be well understood by reference to Fig. 10 wherein the terminal marked t is connected by a conductor 26 to a contact or connection k which will always be negative and the terminal t is therefore connected as shown to the negative terminal on the rheostat or split resistance 29 of known type. The terminals r and u are connected by conductors 27, 28 to contacts or connections 38, 39 which are always positive (for the brush switch 8$^a$ takes up either the position in full black lines or the position in dotted lines) and these terminals r and u are therefore connected to the end terminals 41 and 43 of the rheostat 29. The terminal s is by the conductor 29' connected to the plate 12 which is connected alternately to the contacts 38 or 39 by the oscillatory switch 8$^a$, the plate 12 being connected with the lamp terminal 45 mounted on the rheostat board which terminal is connected with the lamps 30 as shown, the opposite terminals of the lamps being connected to the negative pole of the battery 31, which is preferably of the split type shown. In addition to what has been described there is a switch 32 in the field winding 34 of the dynamo so that the field winding 34 is only energized upon the attainment of the predetermined speed. There may be a fuse 33 between the negative conductors 46 and 26.

In Fig. 10 the plug j receives current as above described and electrifies the plate 11 from which plate the following branch circuits run to the negative terminal 40 on the rheostat 29 viz. (a) through switch 32, field winding 34 (b) switch 8$^a$, plate 38, wire 27, terminal r, right hand terminal 41 on rheostat 29, upper part of battery 31, and wire 42 (c) left hand brush of switch 8$^a$, plate 38, wire 27, terminal r, terminal 41, resistance 29, terminal 43, wire 44 to terminal u, wire 28, plate 39, opposite brush of switch 8$^a$, plate 12, wire 29' terminal s, lights terminal 45, lamps 30 and wire 42 (d) left hand brush of switch 8$^a$, plate 38, wire 27, terminal r, terminal 41, resistance 29, terminal 43 lower part of battery 31 and wire 42. From the negative terminal 40 the common return is by way of wire 46, terminal t wire 26, and negative plug k. Thus the field winding 34, half battery without resistance, lamps with resistance and half battery with resistance are all in parallel.

When the dynamo is not being driven fast enough for the governor device to rock the frame n to close the above circuits, then the switch device 5, 6 is closed and short circuits the larger part of the resistance 29 and the circuit will be (in the position of the parts seen in Fig. 10 for instance):—from the upper part of the battery 31, to terminal 41, to switch 5, 6, through smaller part of resistance to terminal 43, by wire 44 to terminal u, wire 28, right hand brush of switch 8$^a$, wire 29', terminal s, terminal 45, through lamps back to battery; from the lower half of the battery the current passes direct to terminal 43 and there joins the current from the other battery part. The same circuits are made when the battery reverses as will be well understood.

In Fig. 11 which represents the constructions comprising two contacts on the rocker a and three on the pivoted frame n, the wire 26 is in connection with the middle contact 16 which is always, say, negative and in one direction of rotation the current will be received from the contact 15 through the plate 36 and wire 27 while in the opposite direction it will be received from the brush 17 plate 37 and through the wire 28. In the first case the circuits from the plate 36 to the negative terminal 40 on the resistance board are as follows:—(a) through contact 20$^a$ to plate 35, switch 32, field winding 34, (b) wire 27, terminal r to terminal 41, upper part of battery and wire 42, (c) wire 27, terminal r to terminal 41, resistance 29, terminal 43 to terminal u, wire 28, contact 7', bar 20, wire 29', terminal s, to terminal 45, lamps 30, wire 42, (d) wire 27, terminal r to terminal 41, resistance 29, terminal 43, lower part of battery wire 42. From the terminal 40 the current passes by wire 46, fuse 33, terminal t and wire 26 to the negative brush 16. When the dynamo is reversed the current arrives by way of plate 37 and wire 28 and the circuits are:— (a) as before (b) wire 28, terminal u to terminal 43, lower part of battery (c) wire 28, terminal u, wire 44 to terminal 43, resistance 29, terminal 41 to terminal r, wire 27, contact 7, bar 20, wire 29', terminal s, terminal 45, lamps 30 (d) wire 28, terminal u to terminal 43, resistance 29, terminal 41, upper part of battery. The circuits, when the dynamo is not working, are the same as in Fig. 10.

What we claim and desire to secure by Letters Patent of the United States is:—

1. Electric light control comprising in combination dynamo terminal contacts, a rotative support for said terminal contacts, means operatively connecting a rotative part of the dynamo with said rotative support, circuit terminal contacts coöperative with said dynamo contacts, a support therefor movable axially of said dynamo and a centrifugal device rotatable with said rotative part and operatively connected with the axially movable support for the purpose set forth.

2. Electric light control comprising in combination dynamo terminal contacts, a rotative support for said terminal contacts, stops for limiting the movement in either direction of said support, frictional means for connecting a rotative part of the dynamo with said rotative support, circuit terminal contacts coöperative with said dynamo contacts, a support for said circuit contacts movable axially of said dynamo, and a centrifugal device rotatable with said rotative part and operatively connected with the axially movable support for the purpose set forth.

3. Electric light control comprising in combination dynamo terminal contacts, an oscillatory support for said terminal contacts, frictional means for connecting a rotative part of the dynamo with said oscillatory support, circuit terminal contacts coöperative with said dynamo contacts, a pivotal support for said circuit contacts movable to carry said circuit contacts axially of said dynamo, and a centrifugal device rotatable with said rotative part and operatively connected with said pivotal support for the purposes set forth.

4. Electric light control comprising in combination dynamo terminal contacts an oscillatory support for said terminal contacts, frictional means for connecting a rotative part of the dynamo with said oscillatory support, circuit terminal contacts coöperative with said dynamo contacts, a lever pivoted to one side of the axis of said dynamo and with its free end reaching to the opposite side thereof, means on said free end for supporting the circuit contacts thereon, a governor device, driving connection between said governor and said rotative part, and operative connection between said governor and said lever for the purpose set forth.

5. Electric light control comprising in combination dynamo terminal contacts, an oscillatory holder for the brushes of the dynamo, connections between said holder and said contacts, stops in the path of movement in either direction of said holder, circuit terminal contacts coöperative with said dynamo contacts, a pivotal support for said circuit contacts movable to carry said circuit contacts axially of said dynamo, and a centrifugal device rotatable with the dynamo shaft and operatively connected with said pivotal support for the purpose set forth.

6. Electric light control comprising in combination dynamo terminal contacts, a brush holder rotatively mounted upon the shaft of the dynamo, connections between said holder and said contacts, stops in the path of movement of said holder in either direction, circuit terminal contacts coöperative with said dynamo contacts, a lever pivoted to a support on one side of said shaft and with its free end reaching to the opposite side thereof, means on said free end for supporting the circuit contacts thereon, a centrifugal governor rotatable with said shaft and a link connection between the sleeve of said governor and said lever for the purpose set forth.

7. Control for electric lighting system in which the lamps are supplied either from a dynamo or from one of two storage batteries either of which may be charged by the dynamo direct while the other is charged through a resistance and in parallel with the lamps, comprising in combination dynamo terminal contacts, a rotative support for said terminal contacts, means operatively connecting a rotative part of the dynamo with said rotative support, circuit terminal contacts coöperative with said dynamo contacts, a support therefor movable axially of said dynamo, a centrifugal device rotatable with said rotative support, and operatively connected with the axially movable support, a change-over switch arm mounted on said axially movable support said arm being connected with a circuit terminal of the lamps and contactible with a circuit terminal of either battery and abutments connected with said rotative support either one of which abutments may be brought into operative relation with said switch arm upon said axial movement taking place, substantially as set forth.

8. Control for electric lighting system in which the lamps are supplied either from a dynamo or from one of two storage batteries either of which may be charged by the dynamo direct while the other is charged through a resistance and is in parallel with the lamps, comprising in combination dynamo terminal contacts, an oscillatory support for said terminal contacts, frictional means for connecting a rotatable part of the dynamo with said oscillatory support, circuit terminal contacts coöperative with said dynamo contacts, a pivotal support for said circuit contacts movable to carry said circuit contacts axially of said dynamo, a centrifugal device rotatable with said rotative part and operatively connected with said pivotal support, a double armed change-over switch lever pivotally mounted on said pivotal support arms of said lever being connected with a circuit terminal of the lamps and contactible with a circuit terminal of either battery, and abutments connected with said oscillatory support either one of which abutments may be brought into the path of the corresponding lever arm so as to operate said arm when said pivotal support is turned in one direction, substantially as set forth.

9. Control for electric lighting system in which the lamps are supplied either from a dynamo or from one of two storage batteries either of which may be charged by the dynamo direct while the other is charged through a resistance and is in parallel with the lamps, comprising in combination dynamo terminal contacts, an oscillatory support for said terminal contacts, frictional means for connecting a rotatable part of the dynamo with said oscillatory support, circuit terminal contacts coöperative with said dynamo contacts, a pivotal support for said circuit contacts movable to carry said circuit contacts axially of said dynamo, a centrifugal device rotatable with said rotative part and operatively connected with said pivotal support, an oscillatory switch bar pivotally mounted on said pivotal support said bar being connected with a circuit terminal of the lamps and contactible with a circuit terminal of either battery, abutment arms projecting from each end of said bar, abutments connected with said oscillatory support and capable of being brought one at a time into operative relation with one of said arms to actuate said switch bar when said pivotal support is turned in one direction, substantially as set forth.

10. Control for electric lighting system in which the lamps are supplied either from a dynamo or from one of two storage batteries either of which may be charged by the dynamo direct while the other is charged through a resistance and is in parallel with the lamps, comprising in combination dynamo terminal contacts, an oscillatory support for said terminal contacts, frictional means for connecting a rotatable part of the dynamo with said oscillatory support, circuit terminal contacts coöperative with said dynamo contacts, a pivotal support for said circuit contacts movable to carry said circuit contacts axially of said dynamo, a centrifugal device rotatable with said rotative part and operatively connected with said pivotal support, a two armed oscillatory switch bar pivotally mounted on said pivotal support said bar being connected with a circuit terminal of the lamps and contactible with a circuit terminal of either battery, a projection on each arm of said bar, two abutments connected with said oscillatory support in such a position that either one may be brought into the path of the corresponding one of said projections to actuate the switch when said pivotal support is turned in one direction, substantially as set forth.

11. Control for electric lighting system in which the lamps are supplied either from a dynamo or from one of two storage batteries either of which may be charged by the dynamo direct while the other is charged through a resistance and is in parallel with the lamps, comprising in combination dynamo terminal contacts, an oscillatory support for said terminal contacts, frictional means for connecting a rotatable part of the dynamo with said oscillatory support, circuit terminal contacts coöperative with said dynamo contacts, a pivotal support for said circuit contacts movable to carry said circuit contacts axially of said dynamo, a centrifugal device rotatable with said rotative part and operatively connected with said pivotal support, a switch part fixed on said pivotal support, a coöperative switch part secured upon the fixed framing of the dynamo said switch parts being in engagement below a certain speed of said centrifugal device but the first named switch part being carried by said pivotal support out of engagement above such speed, a double-armed change-over switch lever pivotally mounted on said pivotal support said bar being connected with a circuit terminal of the lamps and contactible with a circuit terminal of either battery, a projection on each arm of said switch and abutments connected with said oscillatory support adapted to be rocked into the paths of respective projections for operating said lever when said pivotal support is turned in one direction, substantially as set forth.

12. Control for electric lighting system in which the lamps are supplied either from a dynamo or from one of two storage batteries either of which may be charged by the dynamo direct while the other is charged through a resistance and in parallel with the lamps, comprising in combination dynamo terminal contacts, a brush holder rotatively mounted upon the shaft of the dynamo, connections between said holder and said contacts, stops in the path of movement of said holder in either direction, circuit terminal contacts coöperative with said dynamo contacts, a lever pivoted to a support on one side of said shaft and with its free end reaching to the opposite side thereof, means on said free end for supporting the circuit contacts thereon, a centrifugal governor rotatable with said shaft, a link connection between the sleeve of said governor and said lever, a two armed switch bar pivotally carried on the free end of said lever said bar being connected with a circuit terminal of the lamps and contactible with a circuit terminal of either battery, a projection on each arm of said bar, abutments connected with said oscillatory support in such a position that the proper abutment is carried by said support into the path of the corresponding one of said arms to operate said switch when said lever is turned in one direction, substantially as set forth.

13. Switch mechanism for controlling lighting and battery charging circuits, comprising axially movable non-rotatable switch members, switch members rotatable by the dynamo to properly position said members with regard to said non-rotatable members, a governor driven by said dynamo, and an operative connection between said non-rotatable members and said governor for imparting axial movement to said members for the purpose set forth.

14. Switch mechanism for controlling lighting and battery charging circuits, comprising non-rotatable switch members, switch members rotatable by the dynamo to properly position said members with regard to said non-rotatable members, a reversing switch, an abutment movable with said rotatable switch members to properly position said abutment with regard to said reversing switch, a governor driven by said dynamo and an operative connection between said non-rotatable members and said governor for the purpose set forth.

In testimony whereof we have signed our names to this specification in the presence of two subscribing witnesses.

EDWIN MUMFORD PRESTON,
ALFRED ERNEST KENNARD.

Witnesses:
HENRY GEORGE SIMPSON.
LEONARD JOHN ROBERTS.